United States Patent
Romatier et al.

(10) Patent No.: US 6,168,765 B1
(45) Date of Patent: Jan. 2, 2001

(54) PROCESS AND APPARATUS FOR INTERBED INJECTION IN PLATE REACTOR ARRANGEMENT

(75) Inventors: Jacques J. L. Romatier, Riverwoods; Robert C. Mulvaney, III, Arlington Heights; John A. Petri, Wheeling, all of IL (US)

(73) Assignee: UOP LLC, Des Plaines, IL (US)

( * ) Notice: Under 35 U.S.C. 154(b), the term of this patent shall be extended for 0 days.

(21) Appl. No.: 09/149,841

(22) Filed: Sep. 8, 1998

(51) Int. Cl.[7] ................ F28F 3/00; F28F 3/14; F28F 9/02
(52) U.S. Cl. ............... 422/200; 422/198; 165/166; 165/173; 165/DIG. 355; 165/DIG. 356
(58) Field of Search .................. 422/200, 181, 422/187–194, 198; 585/530; 165/58, 138, 164, 165, 166, 167, 170, 186, DIG. 355, DIG. 356, 173, 175, 176

(56) References Cited

U.S. PATENT DOCUMENTS

| 3,761,536 | * | 9/1973 | Bozik et al. | 585/530 |
|---|---|---|---|---|
| 4,101,287 | * | 7/1978 | Sweed et al. | 422/200 |
| 4,337,170 | * | 6/1982 | Fuderer | 252/373 |
| 5,036,037 | * | 7/1991 | Kladnig et al. | 502/319 |
| 5,037,619 | * | 8/1991 | Alagy et al. | 422/191 |
| 5,130,106 |   | 7/1992 | Koves et al. | 422/216 |
| 5,225,575 | * | 7/1993 | Ivanov et al. | 549/249 |
| 5,405,586 |   | 4/1995 | Koves | 422/218 |
| 5,525,311 |   | 6/1996 | Girod et al. | 422/200 |

* cited by examiner

Primary Examiner—Marian C. Knode
Assistant Examiner—Alexa A. Doroshenk
(74) Attorney, Agent, or Firm—John G. Tolomei; James C. Paschall

(57) ABSTRACT

A process and apparatus for indirectly exchanging heat with narrow channel in a heat exchange type reaction zone uses manifold space to interconnect the common ends of channels and to provide controlled distribution of additional reactants. The invention simplifies the operation and construction of the heat exchanging type reaction zone by directly communicating reaction channels and/or heating channels with a manifold located at the end of the channels. The manifold can provides the extra function of mixing additional reactants. The invention promotes simplified intermediate injection of reactants over tube and shell heat transfer arrangements that have been used for similar purposes. Improved process control has particular benefits for exothermic reactions. The narrow channels are preferably defined by corrugated plates. The reaction channels will contain a catalyst for the promotion of the primary reaction.

20 Claims, 15 Drawing Sheets

PROCESS AND APPARATUS FOR INTERBED INJECTION IN PLATE REACTOR ARRANGEMENT

FIELD OF THE INVENTION

This invention relates generally to plate type exchanger arrangements for containing a reaction zone and indirectly heating the reaction zone with a heat exchange fluid.

BACKGROUND OF THE INVENTION

In many industries, like the petrochemical and chemical industries, contact of reaction fluids with a catalyst in a reactor under suitable temperature and pressure conditions effects a reaction between the components of one or more reactants in the fluids. Most of these reactions generate or absorb heat to various extents and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone.

Exothermic reaction processes encompass a wide variety of feedstocks and products. Moderately exothermic processes include methanol synthesis, ammonia synthesis, and the conversion of methanol to olefins. Phthalic anhydride manufacture by naphthalene or orthoxylene oxidation, acrylonitrile production from propane or propylene, acrylic acid syntheses from acrolein, conversion of n-butane to maleic anhydride, the production of acetic acid by methanol carbonylation, and methanol conversion to formaldehyde—represents another class of generally highly exothermic reactions. Oxidation reactions in particular are usually highly exothermic. The exothermic nature of these reactions has led to many systems for these reactions incorporating cooling equipment into their design. Those skilled in the art routinely overcome the exothermic heat production with quench or heat exchange arrangements. Extensive teachings detail methods of indirectly exchanging heat between the reaction zone and a cooling medium. Indirect heat exchange refers to the transfer of heat from one fluid to another fluid across a common surface without intermixing of the fluids as normally occurs in quench systems. The art currently relies heavily on tube arrangements to contain the reactions and supply indirect contact with the cooling medium. The geometry of tubular reactors poses layout constraints that require large reactors and vast tube surfaces to achieve high heat transfer efficiencies.

Other process applications accomplish indirect heat exchange with thin plates that define channels. The channels alternately retain catalyst and reactants in one set of channels and a heat transfer fluid in adjacent channels for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Many hydrocarbon conversion processes will operate more advantageously by maintaining a temperature profile that differs from that created by the heat of reaction. In many reactions, the most beneficial temperature profile will be obtained by maintaining substantially isothermal conditions. In some cases, a temperature profile directionally opposite to the temperature changes associated with the heat of reaction will provide the most beneficial conditions. For such reasons, it is generally known to contact reactants with a heat exchange medium in cross flow, cocurrent flow, or countercurrent flow arrangements. A specific arrangement for heat transfer and reactant channels that offers more complete temperature control can be found in U.S. Pat. No. 5,525,311; the contents of which are hereby incorporated by reference. Other useful plate arrangements for indirect heat transfer are disclosed in U.S. Pat. No. 5,130,106 and U.S. Pat. No. 5,405,586.

Isolating reactants from coolants at the inlets and outlets of plate exchanger arrangements leads to elaborate designs and intricate manufacturing procedures. Simplification of the fluid transfer at the inlets and outlets of plate exchanger improves the cost effectiveness and practicality of plate exchanger usage in many processes. Improved arrangements for injecting reactants at intermediate locations along the process flow path can also improve reactor performance in terms of selectivity and yields.

It is, therefore, an object of this invention to simplify a plate exchanger design for the indirect heat transfer and injection of reactants in reaction zone.

It is a further object of this invention to simplify the feed and recovery of reactants and heat exchange fluid from a heat exchange reactor that uses a channel arrangement.

BRIEF SUMMARY OF THE INVENTION

In broadest terms this invention incorporates intermediate injection of process fluids into open chamber portions that circulate fluid from a plurality of heat exchange channels to another plurality of heat exchange channels to control process reaction conditions and reactant concentrations. A chamber communicates the heated channels and the reaction zone across common ends of the narrow channels while simultaneously mixing reactants the ends of the channels to provide simple transfer of fluids between different sets of channels. The chamber permits additional temperature control by the addition or removal of reactants, cooling fluids or other streams at an intermediate point in the complete channel flow paths. Insertion of additional chambers along the flow path of either the reaction or heated channels provides locations for more temperature adjustment and control.

Suitable channel arrangements may exchange heat directly across a common heat exchange surface or may use an intermediate heat transfer fluid to indirectly transfer heat from a cooling or heating zone to the reaction zone. In this manner the intermediate heat transfer fluid allows optimization of conditions for endothermic and exothermic reactions in different channels while simultaneously providing temperature adjustment control for differences in heat generation from the exothermic reaction and heat absorption from the endothermic reaction. For example, one arrangement of the intermediate heat transfer fluid may place the cooling zone and the reaction zone at different portions of common channel and may pass the intermediate fluid through adjacent channels to transfer heat out of reaction channels at one location and transfer heat back into the heated channels at a downstream channel location. In other arrangements, the intermediate channels and the reaction channels may lie in a parallel arrangement between the heated channels to adjust the temperature in the reaction channels through the heated channels.

Variation of the catalyst loading within the reaction channels and the addition of catalyst for endothermic reactions may satisfy different processing objectives. For example, short loading of catalyst in reaction channels can provide a space above or below the reaction zone for additional feed preheat or effluent cooling. Again, extending the heated channels can provide additional surface area for open channel heat exchange against the exiting reaction zone effluent or the incoming reactants.

Although useful in any heat producing reaction or heat absorbing reaction, this invention finds its greatest benefit in exothermic reactions. As an example, process and reactor arrangements in accordance with this invention may be especially useful for producing ethylene oxide. A particularly beneficial process application for this invention is in the production of phthalic anhydride (PA) by the oxidation of orthoxylene. The reaction apparatus feeds the orthoxylene feed to a distribution manifold that injects a controlled amount of orthoxylene in admixture with the air or other oxygen containing gas. Injection of the orthoxylene into the manifold prevents the presence of the orthoxylene and oxygen in explosive proportions. The manifold preferably contains a packing making, such as inert particles, to reduce the volume of the chamber and minimize the amount of mixed orthoxylene and oxygen. The plate arrangement of the heat exchange reactor quickly dissipates the high heat of reaction associated with the synthesis of the PA. The enhanced temperature control improves product selectivity while also permitting increased throughput.

The reaction apparatus designed in accordance with this invention offers a high degree of flexibility in temperature control with a relatively simple plate reactor arrangement. The outer containment vessel can completely support the plate arrangement from either its top or bottom. Direct passage of heated reactants from the heated channels outlets to reaction channels inlets through a common chamber eliminates the need for manifolding and its associated welding at at least one end of the typically thin channel plates.

The presence of narrow heat exchange channels for cooling the reaction zone and heating the reactants constitutes an essential requirement of this invention. With respect to fluid flow through the reaction channels and heated channels, fluid may have cocurrent flow or cross flow with respect to some of the channels. The plates defining the channels for containing the reactions and heat exchange gases may have any configuration that produces narrow channels. A preferred form of the heat exchange elements is relatively flat plates having corrugations defined therein. The corrugations serve to maintain spacing between the plates while also supporting the plates to provide a well supported system of narrow channels. Additional details on the arrangement of such plates systems are shown in U.S. Pat. No. 5,525,311; the contents of which are hereby incorporated by reference.

One distinct advantage discovered with the plate heat exchanger design of this invention permits an increase in the overall feed rate of oxidated reactants without increasing their overall concentration in feedstream mixtures that comprise air or oxygen. Notably for production of PA, the process and plate reactor arrangement of this invention significantly increases the amount of orthoxylene that can enter the reaction zone for a given constant air feed rate to the reaction channels.

Suitable plate arrangements may also incorporate perforated plates. Most advantageously, perforated plates allow the controlled quantities of the heated reactant to flow directly into the reaction channels. Perforated plates disperse the introduction of the reactant over a desired portion of the reaction zone. Those skilled in the art will recognize other variations in plate configurations that can provide additional benefits to the integrated reaction stages.

Accordingly, in a broad process embodiment, this invention contacts reactants with a catalyst in a reaction zone while indirectly heating or cooling the reactants in the reaction zone by indirect heat exchange with a heat exchange fluid. The process passes a reactant-containing stream through a first plurality of channels defined by spaced apart plates and recovers a first channel effluent. A first channel effluent stream collects in a manifold volume having direct communication with outlets of the first plurality of channels. The process injects an intermediate fluid into the manifold volume and mixes at least a portion of the first channel effluent to produce a second channel input stream. The second channel input stream passes from the manifold volume directly into the inlets of a second plurality of channels defined by spaced apart plates. The process recovers a second channel effluent stream from the outlets of the second portion of spaced apart plates. At least the reactant stream or the second channel input stream contacts a catalyst in the first plurality of channels or the second plurality of channels. The process indirectly exchanges heat between the reactant-containing stream, the second channel input stream, and a heat between exchange fluid passing through channels defined by the spaced apart plates.

In a more specific process embodiment, this invention is a process for oxidizing reactants with a catalyst in a reaction zone while indirectly cooling the reactants in the reaction zone by indirect heat exchange with a heat exchange fluid. A first inlet stream containing oxygen and an oxidation reactant passes through a first plurality of channels defined by spaced apart plates and into contact with an oxidation promoting catalyst. An effluent from the outlets of the first plurality of channels passes directly into a manifold volume containing a packing material. The process injects additional oxidation reactant into the manifold volume and mixes fluids therein to produce a second inlet stream containing oxygen and an oxidation reactant. The second inlet stream passes from the manifold volume directly to the inlets of a second plurality of channels defined by the spaced apart plates and through an oxidation promoting catalyst contained in the second plurality of channels. The process recovers a second channel effluent stream from the outlets of the second portion of spaced apart plates and indirectly exchanges heat with the first and second plurality of channels by passing a heat exchange fluid through the heat exchange channels defined by the spaced apart plates. In a preferred form of the exothermic process, the first inlet stream comprises air and orthoxylene; the intermediate stream comprises orthoxylene; and the first and second plurality of channels contain an orthoxylene oxidation catalyst that promotes the production of the second channel effluent comprising phthalic anhydride.

A specific apparatus embodiment of this invention is a particular plate reactor design that advantageously uses the chamber design of this invention to independently pass at least two different fluids through two adjacent sets of channels in countercurrent flow. The specific reactor arrangement may use a perforated manifold arrangement to enhance the even distribution of entering reactants.

In a more complete apparatus embodiment, this invention is a reaction arrangement for contacting reactants with a catalyst in a reaction zone while indirectly heating or cooling the reactants in the reaction zone by indirect heat exchange with a heat exchange fluid. The apparatus comprises a plurality of spaced apart plates that define a first plurality of reaction channels and a second plurality of reaction channels for retaining a catalyst material in at least one of the first and second plurality of channels. The first plurality of reaction channels defines a first plurality of reaction inlets and a first plurality of reaction outlets. The second plurality of reaction channels defines a second plurality of reaction inlets and a second plurality of reaction outlets. The apparatus includes a distribution manifold defining a manifold volume in direct communication with the first plurality of reaction outlets and with the second plurality of reaction inlets and containing an injector for injecting a fluid into the manifold volume. In a more limited form of this apparatus embodiment the plurality of plates defines heat exchange channels between the first and second plurality of reaction channels and the heat exchange channels define heat exchange inlets for receiving a heat exchange fluid and heat exchange outlets for discharging a heat exchange fluid. A particularly beneficial arrangement of manifolds uses a first distribution header that partially covers one side of a stack of heat exchange plates defined by the plurality of plates. The first distribution header extends across at least one of the heat exchange inlets or heat exchange outlets to define a first distribution space that communicates directly with the inlet or outlet across which it extends to distribute or collect the heat exchange fluid. A second distribution header partially covers the one side of the stack of heat exchange plates and partially covers at least a portion of the first distribution header. The second distribution header extends across at least one of the first reaction inlets or the first reaction outlets to define a second distribution space that communicates directly with the inlet or outlet across which it extends to distribute or collect fluid.

Additional embodiments, arrangements, and details of this invention are disclosed in the following detailed description of the invention.

DETAILED DESCRIPTION OF THE INVENTION

Figure 1:
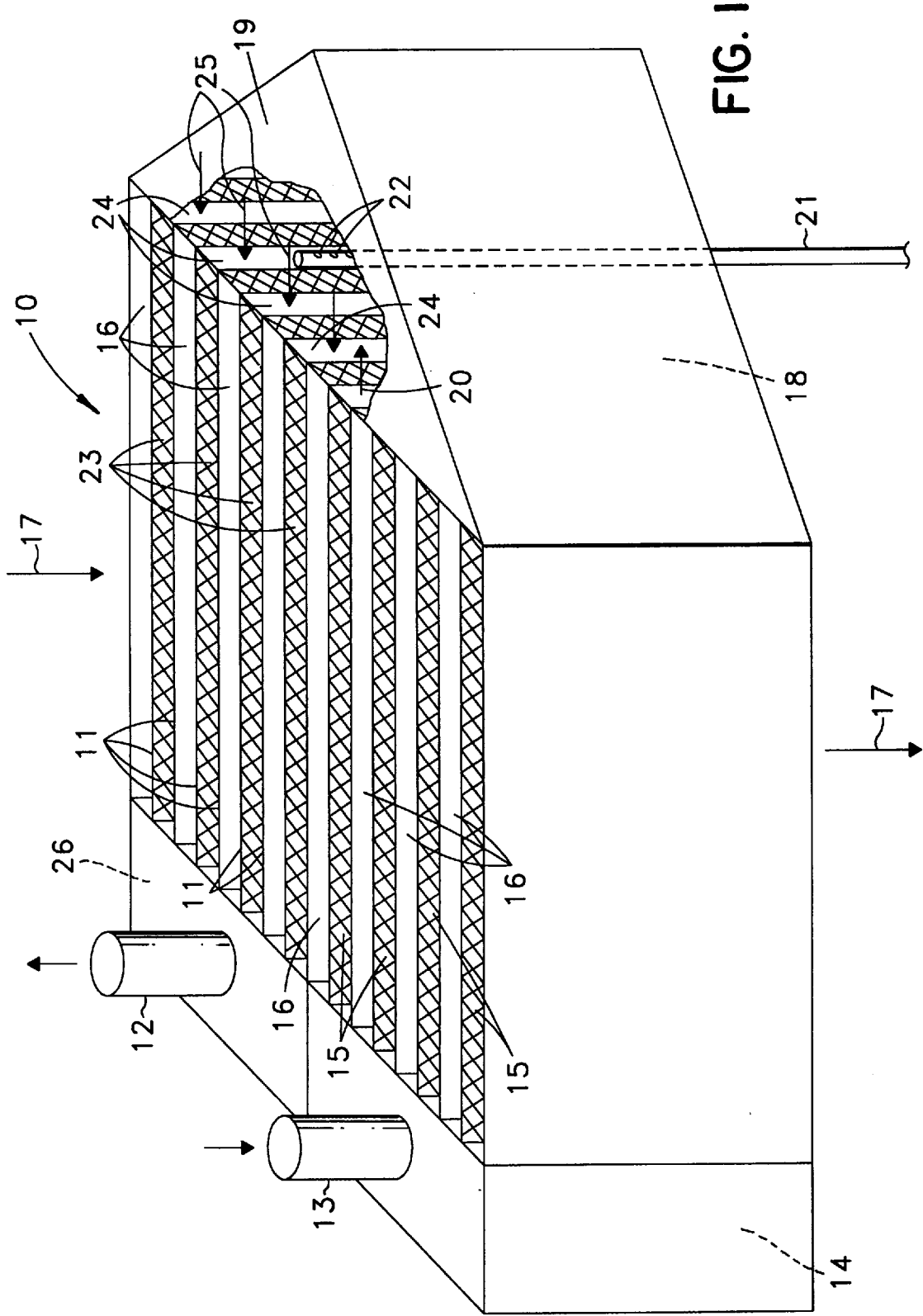
FIG. 1 is a three dimensional view schematically showing a plate reactor arranged in accordance with this invention.

This invention may be useful in any endothermic or exothermic process where a reactant or a portion of a reactant provides a heat sink for heating an endothermic reaction or for cooling an exothermic reaction in an arrangement of plate exchanger elements. Additional requirements of this process for compatibility with a plate exchanger arrangement will typically require that there be a relatively low ΔT between any heat exchange zone and reaction zone. Differential temperatures of 200° C. or less are preferred for this invention. Differential pressures will remain low and will typically reflect pressure drop requirements through the catalyst bed. Ordinarily the differential pressure across plate elements will not exceed 0.5 MPa.

The reaction channels will contain a catalyst for promoting the reaction. Suitable catalysts for the previously mentioned processes as well as other process applications are well known to those skilled in the art. Catalyst in a particulate form may fill the reaction channels to the degree desired for reaction time and pre-reaction heating or post-reaction cooling in the reaction channels. As an alternate to a particulate catalyst, the catalyst may also be coated on the surface of the plates in the various reforming zones. It may be particularly advantageous to coat the reaction catalyst onto the plates to provide an upper catalytic section and a lower catalyst-free section that is maintained in heat relationship across the channel defining plates with a secondary catalytic zone.

The heat exchange fluid used in the process or apparatus of this invention may be any type of fluid that can provide the necessary cooling or heating capacity. A wide variety of heat exchange fluids may satisfy the requirement for heating or cooling. Such fluids will include integral process streams as well as auxiliary fluids. The fluid may absorb or release heat by sensible, latent or reactive means. For highly exothermic processes, molten salts or metals may be particularly useful as a heat exchange medium.

Where suitable for balancing heat requirements of a particular reaction, those skilled in the art are aware of particular catalysts for promoting complimentary exothermic and endothermic reactions. Such catalysts may advantageously reside in the heating channels to provide reactive cooling as well as cooling from the sensible or latent heat of the reactants. Examples of such an endothermic and exothermic catalyst combinations are in steam reforming and in the oxidative heating of an ethylbenzene dehydrogenation reaction by combustion of the hydrogen produced therein. Such an arrangements are particularly suited for incorporation into a multiple pass channel arrangement that interconnects only two pairs of adjacent channels and places an exothermic reaction channel between an alternate heating channel and endothermic reaction channels. In a configuration providing such a three pass arrangement the relatively cold reactants flow into the heating channels where indirect heat exchange with the reaction channels provides the respective heating and cooling. Flowing the reacted stream from the exothermic reaction channels into the endothermic reaction channels provides additional cooling to the reaction channels across the shared of plates that define the endothermic reaction channel as well as the adjacent exothermic reaction channels.

FIG. 1 illustrates a basic flow arrangement for the process of this invention. The discussion of FIG. 1 uses the production of phthalic anhydride (PA) as an example of a specific context for an exothermic process; however the general principles apply to any exothermic process including those previously enumerated. Looking then at FIG. 1 for a basic flow arrangement of this invention, a relatively cold feedstream comprising orthoxylene and air in a proportion of about 70 g of orthoxylene per $Nm^3$ of air enters the process and undergoes heat exchange in a conventional heat exchanger (not shown). Typically the feed stream exchanges heat with a PA gas product stream carried from a nozzle 12 of a heat exchange reactor 10. The preheated feedstream passes via an inlet nozzle 13 to a distribution chamber 14. Heat exchange reactor 10 contains a plurality of heat exchange plates 11 that define sets of channels. Distribution chamber 14 supplies the heated feed to a first set of reaction channels 15 having inlets in chamber 14. Reaction channels 15 contain an oxidation catalyst through which the feed passes.

As the entering feed passes through the reaction channels 15, a cooling fluid passes through a plurality of heat exchange channels 16 in a flow direction shown by arrows 17 which establishes a cross flow relationship to the flow in channels 15. Suitable containment chambers (removed for clarity) on the top and bottom of reactor 10 distribute and collect the heat exchange fluid. Plates or other closures seal the tops and bottoms of reaction channels 15 to prevent the heat exchange fluid from entering the channels. The large surface area provided by the plates 11 provide rapid cooling of the reactants and good temperature control.

A manifold volume 18 collects the heated reactant stream from the first set of channels. Top plate 19 covers manifold space 18. The broken away portion of plate 19 shows the relative flow direction of the reactants out of channels 15 in a direction of arrow 20. A pipe lance 21 having perforations 22 injects additional orthoxylene into manifold volume 18. The injected orthoxylene mixes with the partially reacted stream from channels 15 to produce a feedstream with additional orthoxylene for further reaction in a second plurality of reaction channels 23. Plates or other closures seal the sides of the heat exchange channels 16 to prevent the reactants exchange fluid from entering the heat exchange channels. Manifold volume 18 will ordinarily contain a packing material to minimize the potential volume for explosive mixtures of the oxygen-containing gas and orthoxylene. While the drawing only shows one pipe lance, multiple pipe lances may be used to promote enhanced mixing of the partially reacted stream and the additional orthoxylene in manifold volume 18. Pipe lances 21 may be placed immediately adjacent to the inlets 24 of the reaction channels 23. Arrows 25 show the flow direction of the reactants that enter channels 23.

As the second reaction mixture enters channels 23 it contacts additional catalyst contained therein. The resulting reaction releases more heat that is removed by the passage of the cooling fluid through channels 16. A collection chamber 26 collects PA products and reactants from channels 23 for removal by nozzle 12 and subsequent heat exchange, as previously described.

Reaction channels 15 and 23 contain catalyst material that promotes the oxidation of the orthoxylene. Suitable catalyst materials are well known to those skilled in the art. The catalyst material may reside in the channels as a coating applied to plates or as discrete particles. The inlets and outlets of channels 15 and 23 are open to fluid flow. Where the catalyst material comprises a particulate material, a screen material located across the inlets and outlet prevents catalyst from escaping out of the reaction channels.

Distribution chamber 14, manifold volume 18, or collection chamber 26 may contain extra fluid withdrawal or addition pipes. Further fluid addition or withdrawal may provide a number of supplementary functions. For example, addition and return of fluid may provide cooling by passing a portion of the withdrawn reactant-containing stream through a cooler and recirculating the cooled fluid to reaction channels.

It is also not necessary to the practice of this invention that each reaction channel be alternated with a heat exchange channel. Possible configurations of the reaction section may place two or more heat exchange channels between each reaction channel to reduce the pressure drop on the heat exchange medium side. The double channel arrangement may be defined by a plate separating adjacent heat exchange channels that contain perforations. The use of packing or perforated plates can enhance heat transfer with the reaction channels while providing good circulation over the entire cross-section of the heated channel.

In general, the invention relies on relatively narrow channels to provide the efficient heat exchange across the thin plates. In general, the channel width should be less than one inch on average with an average width of less than ½ inch preferred. Suitable plates for this invention will comprise any plates that allow a high heat transfer rate. Thin plates are preferred and usually have a thickness of from 1 to 2 mm. The plates are typically composed of ferrous or non-ferrous alloys such as stainless steel. Preferred alloys for the plates will withstand extreme temperatures and contain high proportions of nickel and chrome. The plates may be formed into curves or other configurations, but flat plates are generally preferred for stacking purposes. Again, each plate may be smooth and additional elements such as spacers of punched tabs may provide fluid turbulence in the channels.

Preferably, each plate has corrugations that are inclined to the flow of reactants and heat exchange fluid. The corrugations maintain a varied channel width defined by the height of the corrugations. In the case of corrugations, the average channel width is most practically defined as the volume of the channels per the cross-sectional area parallel to the primary plane of the plates. By this definition corrugated plates with essentially straight sloping side walls will have an average width that equals half of the maximum width across the channels.

Figure 2:
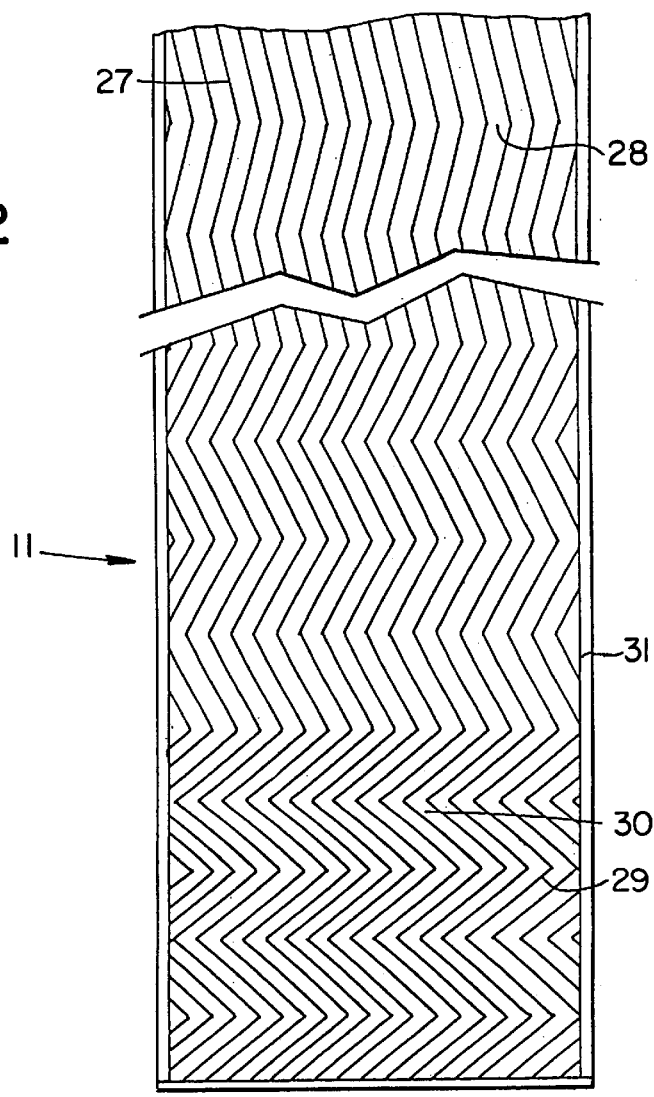
FIG. 2 is a schematic drawing of a flat plate element showing a corrugation pattern.

FIG. 2 shows the preferred corrugation arrangement for plates 11 that divide the central portion of heat exchange reactor 14 into heat exchange channels and reaction channels. The corrugation pattern can serve at least two functions. One function is to structurally support adjacent plates. The other function is to promote turbulence for enhancing heat exchange efficiency in the narrow reaction channel. FIG. 2 shows corrugations defined by ridges 27 and valleys 28. The frequency or pitch of the corrugations may be varied as desired to promote any varying degree of turbulence. Therefore, more shallow corrugations, with respect to the fluid flow direction, as shown by ridges 27 and valleys 28 will produce less turbulence; whereas a greater corrugation pitch with respect to the direction of fluid flow—as shown by ridges 29 and valleys 30—provide increased turbulence where desired. The pitch of the corrugations and the frequency may also be varied over a single heat exchange channel to vary the heat transfer factor in different portions of the channel. Preferably, the channels may contain a flat portion 31 about their periphery to facilitate closure of the channels about the sides and tops where desired.

Figure 3:
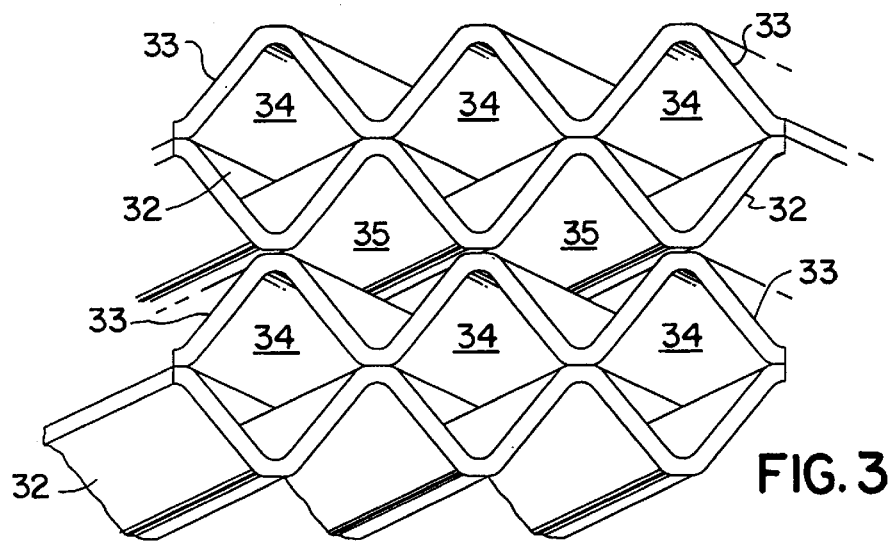
FIG. 3 is an isometric view of corrugated plates forming flow channels.
Figure 4:
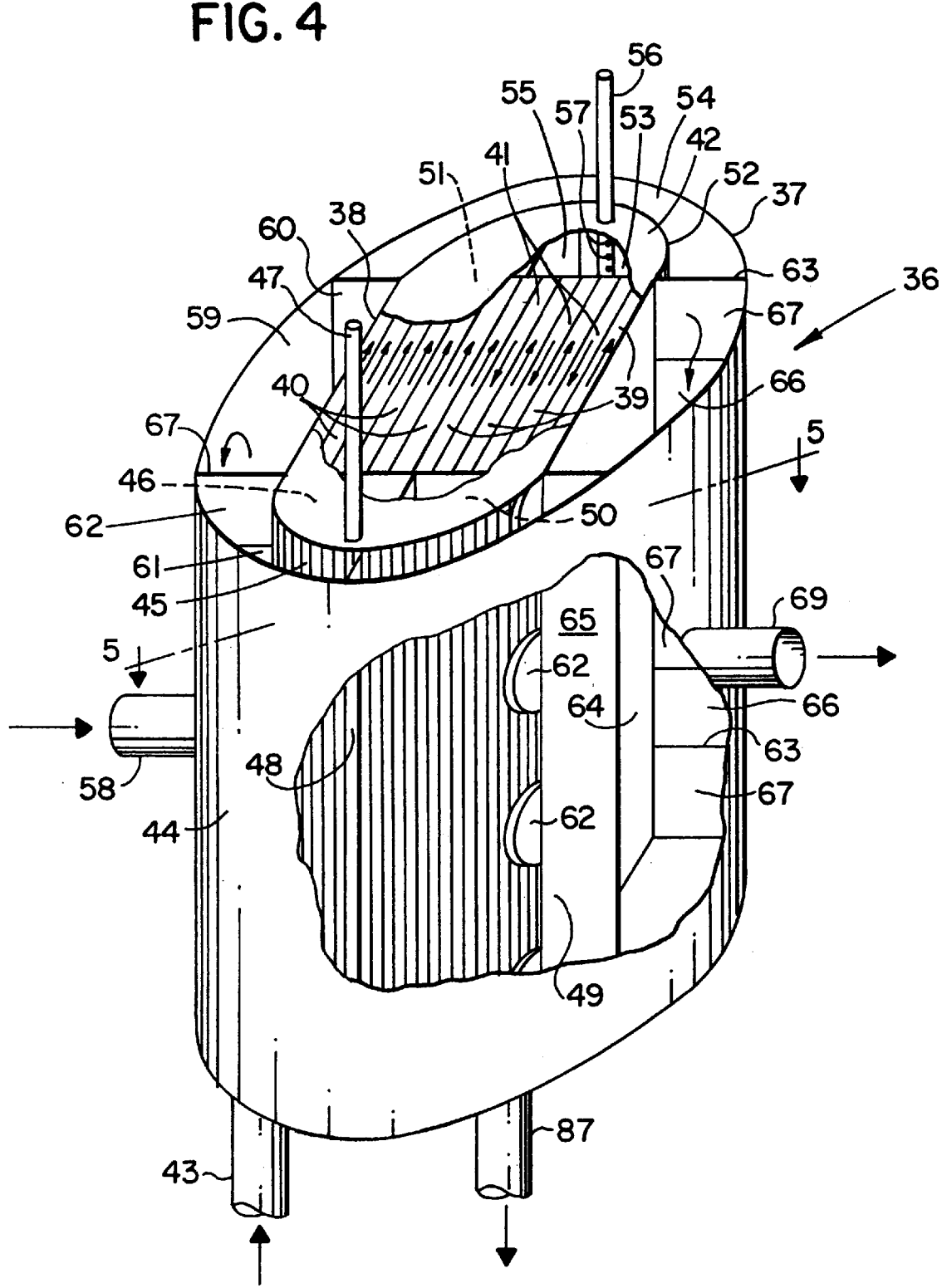
FIG. 4 is a three dimensional view of a plate reactor arrangement and a containment vessel arranged in accordance with this invention.

FIG. 3 shows a typical cross-section of a corrugated plate arrangement wherein the corrugations of plates 32 extend in an opposite direction to the corrugations of plates 33 thereby defining alternate reaction channels 34 and heated channels 35. FIG. 3 illustrates the preferred arrangement of corrugated plates where the herring bone pattern on the faces of opposing corrugated plates extends in opposite directions and the opposing plate faces contact each other to form the flow channels and provide structural support to the plate sections.

Additional channels defined by the plates can provide a variety of supplementary functions. In addition to channels for the heating reactants and/or cooling the reaction zone while containing the exothermic reaction, other channel functions may provide additional preheating of the feed for the exothermic reaction zone, cooling of the effluent from the exothermic reaction zone, and retaining of a catalyst for an endothermic reaction.

A reactor arrangement 36 specially suited for providing good distribution of reactant and heating medium with a cocurrent or countercurrent flow of the reactant and heat exchange fluid is shown in FIGS. 4–7. In this reactor arrangement, a cylindrical vessel 37 surrounds a plurality of heat exchange plates. A top plate 42 covers the vessel 37. A broken away section of top plate 42 shows the plurality of heat exchange plates 38 that define a plurality of heat exchange channels 39, a first plurality of reaction channels 40, and a second plurality of reaction channels 41.

Considering again PA production as a non-limiting example for explaining the apparatus of FIGS. 4–7, an oxidation gas enters the reactor 36 through an inlet nozzle 43 that communicates with an outer distribution chamber 44. Outer distribution chamber 44 distributes the incoming oxidation gas over the surface of a curved screen 45. Curved screen 45 defines an inner distribution chamber 46. Orthoxylene enters inner distribution chamber 46 via a pipe distributor 47 through a row of perforations that extend over the length of inner chamber 46. As the oxidation gas enters inner chamber 46, injection of the orthoxylene mixes the reactants to provide a PA feed mixture. The mixture of reactants enters the inlets of the first set of reaction channels 40. Inner chamber 46 may again contain a particulate material to fill the void volume of chamber 46 and reduce the potential for damage from explosive reaction mixtures. A divider plate 48 separates the volume of the outer distribution chamber 44 and inner distribution chamber 46 from an outer collection chamber 49 and an inner collection chamber 50.

The PA feed mixture passes into the first set of reaction channels 40. Reaction channels 40 contain a catalyst for the promotion of PA production by orthoxylene oxidation. A reacted mixture containing primarily PA and unreacted oxidation gas exits reaction channels 40 and enters an outlet chamber 51. A sidewall 52 forms a lateral boundary of outlet chamber 51 and an intermediate inlet chamber 53. Intermediate inlet chamber 53 may again contain particulate material to reduce any void volume, to reduce the potential for any accumulation of an explosive mixture. Lateral sidewall 52 may provide an impervious surface so that the effluent from reaction channels 40 transfers directly from and remains in outlet chamber 51.

Alternately, lateral sidewall 52 may provide a perforated surface such as the screen surface 45 so that the effluent from reaction channels 40 may enter a supplementary chamber 54 that transfers at least a portion of the effluent from the reaction channels 40 to the intermediate inlet chamber 53. If desired, a partition plate 55 may block any direct fluid transfer from outlet chamber 51 into intermediate inlet chamber 53 thereby directing all fluid flow through the supplementary chamber 54. Directing all of the fluid flow through supplementary chamber 54 and across a perforated wall of lateral sidewall 52 can improve distribution of the oxidation gas and PA over intermediate inlet chamber 53.

Regardless of the fluid flow path between chambers 51 and 53, an additional injection pipe 56 having perforations 57 will mix additional orthoxylene with the oxidation gas and PA for distribution into the second set of reaction channels 41. Additional oxidation of the orthoxylene to produce additional PA takes place by contact with an orthoxylene oxidation catalyst in the second set of reaction channels 41. Inner collection chamber 50 collects any unreacted oxidation gas and orthoxylene as well as the PA product. Outer collection chamber 49 receives the mixture of reactants and PA that exits the reactor 36 through a nozzle 87.

Figure 5:
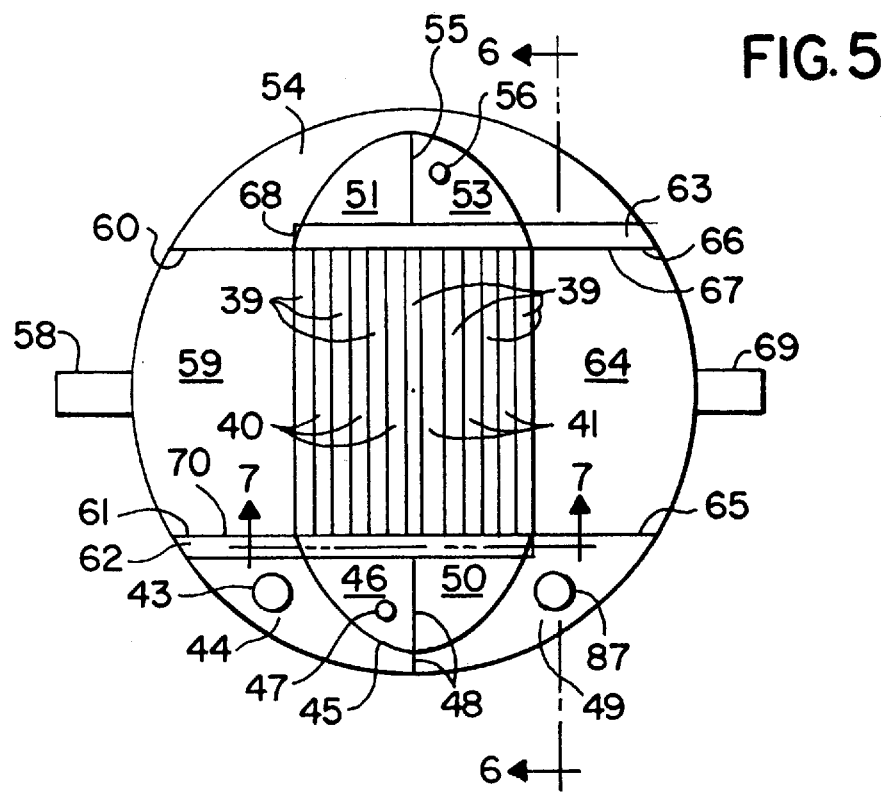
FIG. 5 is a section of FIG. 4 taken at lines 5—5.
Figure 6:
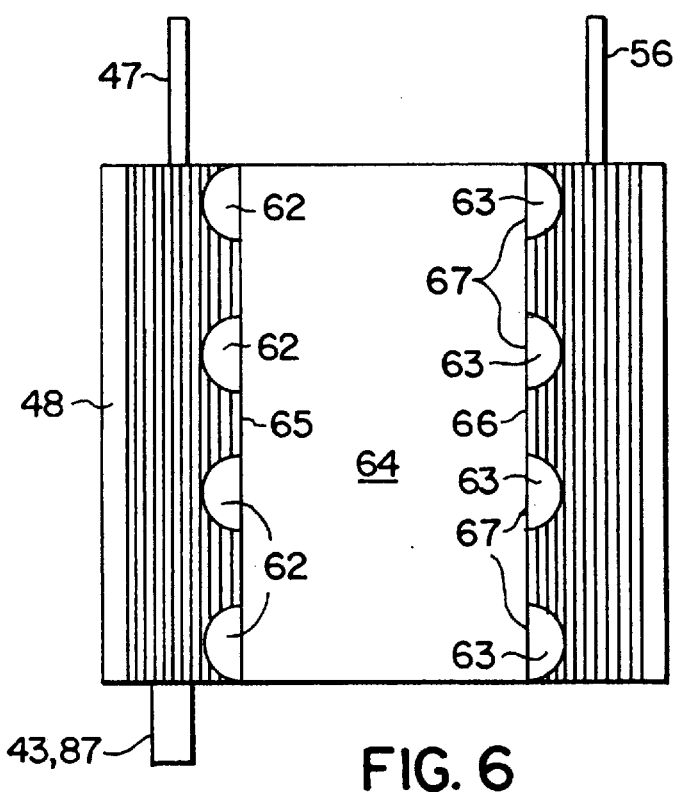
FIGS. 6 and 7 are sections of FIG. 5 taken at line 6—6 and 7—7, respectively.

Throughout the oxidation reaction, a cooling fluid circulates in heat exchange channels 39 to control the temperature of the oxidation reaction. The cooling fluid enters the side of cylindrical vessel 37 through a cooling inlet nozzle 58. Nozzle 58 delivers the cooling fluid to a cooling distribution chamber 59. Coolant partition plates 60 and 61 segregate the incoming fluid from the chambers that contain the reactants or products. A plurality of distribution sub-channels 62 opens to distribution chamber 59 along plate 61 to receive cooling fluid and distribute it to heat exchange channels 39. A plurality of collection sub-channels 63 at the opposite end of heat exchange channels 39 collects the warmed coolant and transfers it via openings 67 into a coolant collection chamber 64. The collected coolant exits chamber 64 through a nozzle 69, typically for cooling and return to inlet 58. A pair of partition plates 65 and 66 segregates the collected coolant from the reactant-containing chambers. Openings 67 are spaced along the length of partition 66. As more clearly shown in FIG. 6, sub-channels 62 and 63 have a semicircular shape An open cordal face of sub-channel 63 faces chamber 64 and defines opening 67 for communicating the warm coolant into chamber 64. As shown in FIG. 5, a closure plate 68 covers the opposite end of collection sub-channel 63 to prevent coolant from entering outer chamber 49. Distribution sub-channels 62 have a similar open cordal face 70 that receives coolant from nozzle 58 via chamber 59.

Figure 7:
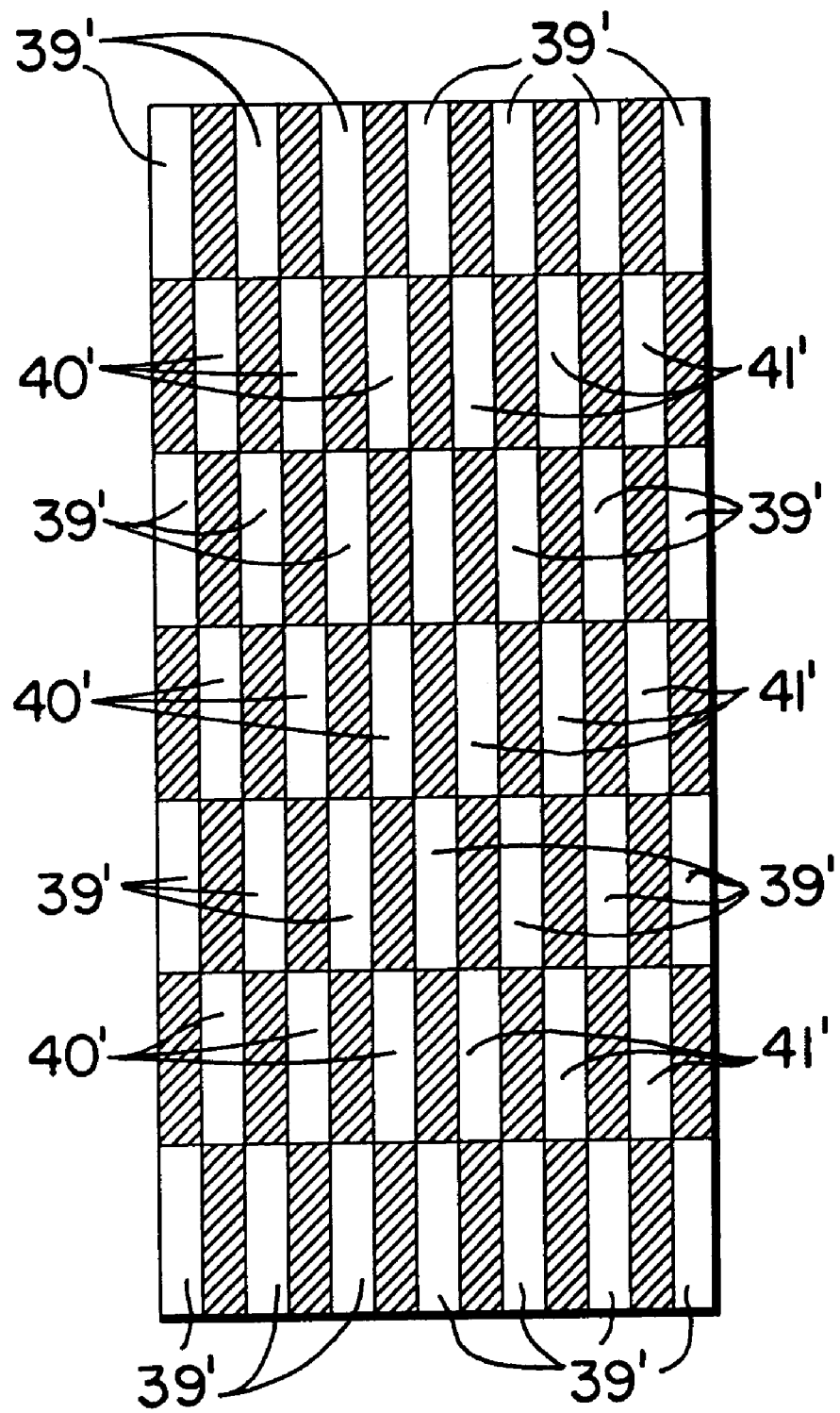

The segregation and distribution of fluid across the open channels are provided by blocking reaction channels that are in communication with sub-channels 62 and by blocking the openings to those portions of the heat exchange channels that are in communication with inner collection chamber 50, outlet chamber 51, inner distribution chamber 46, and intermediate inlet chamber 53. FIG. 7 more clearly shows this distribution pattern where open inlets to the first set of reaction channels are indicated by 40'. Open inlets to the second set of reaction channels are indicated by 41' and open inlets to the heat exchange channels are indicated by 39'. The solid squares indicate where the openings to the heat exchange and reaction channels are closed to fluid flow.

Figure 8:
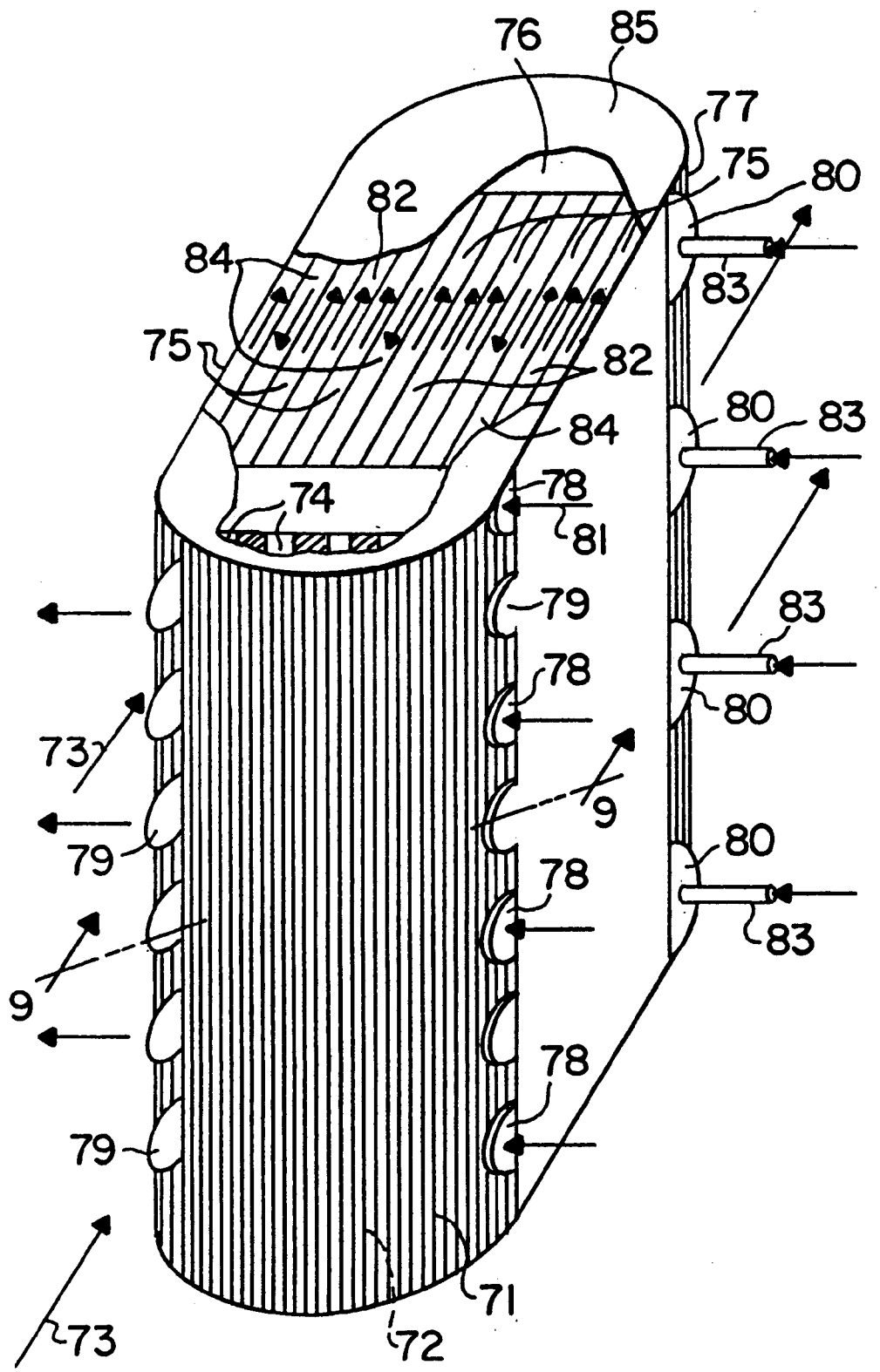
FIG. 8 is a three dimensional view of a plate channel arrangement and distribution header arrangement similar to that shown in FIG. 4.

The reactor design shown in FIGS. 4–7 circulates the reactants in all of the channels 40 in the same direction and cocurrently to the flow in the adjacent heat exchange channels 39 while it circulates all of the flow in the reaction channels 41 in the opposite direction to the flow in the reaction channel 40 ands countercurrently to flow in heat exchange channels 39. Simple changes to the channel distribution and collection arrangements of the reactor facilitates easy variation in the relative flows and flow direction through the channels. In a further example of one such variation, FIG. 8 shows a modified form of the channels and collection and distribution spaces of FIGS. 4–7. The arrangement of FIG. 8 passes a heat exchange fluid through a perforated face 71 of a distribution chamber 72 in the direction indicated by arrows 73. Distribution chamber 72 directs the incoming cooling fluid to inlets 74 of heat exchange channels 75. The cooling fluid flows out of heat exchange channels 75 and into a collection chamber 76 formed in part from a perforated wall of profile wire 77. As the cooling fluid flows out of distribution chamber 72, it passes around inlet sub-channels 78 and outlet sub-channels 79. As the cooling fluid flows into collection chamber 76, it flows around redistribution sub-channels 80.

Reactants enter and leave reaction channels through inlet sub-channel 78 and outlet sub-channel 79, respectively. Again in the case of PA production, a mixture of orthoxylene and oxygen enters the inlet sub-channel 78 in the direction shown by arrows 81. Sub-channels 78 distribute the incoming reactants to a first set of reaction channels 82 for flow towards the redistribution sub-channels 80. Redistribution sub-channels 80 receive unreacted reactants, primarily oxidation components and the PA product. Injection pipes 83 inject additional orthoxylene reactants into the sub-channels 80 for mixing with the effluent from the first set of channels 82. Sub-channels 80 mix and redistribute the orthoxylene oxidation components and PA products to a second set of reaction channels 84. Particulate material or other space displacing means may be located in sub-channels 80 to prevent the filling of the sub-channel volume with explosive fluid mixtures. After contact with additional catalyst in the second set of reaction channels, the PA product and any unreacted components flow into collection sub-channels 79 for recovery from the chamber and plate reaction apparatus.

Figure 9:
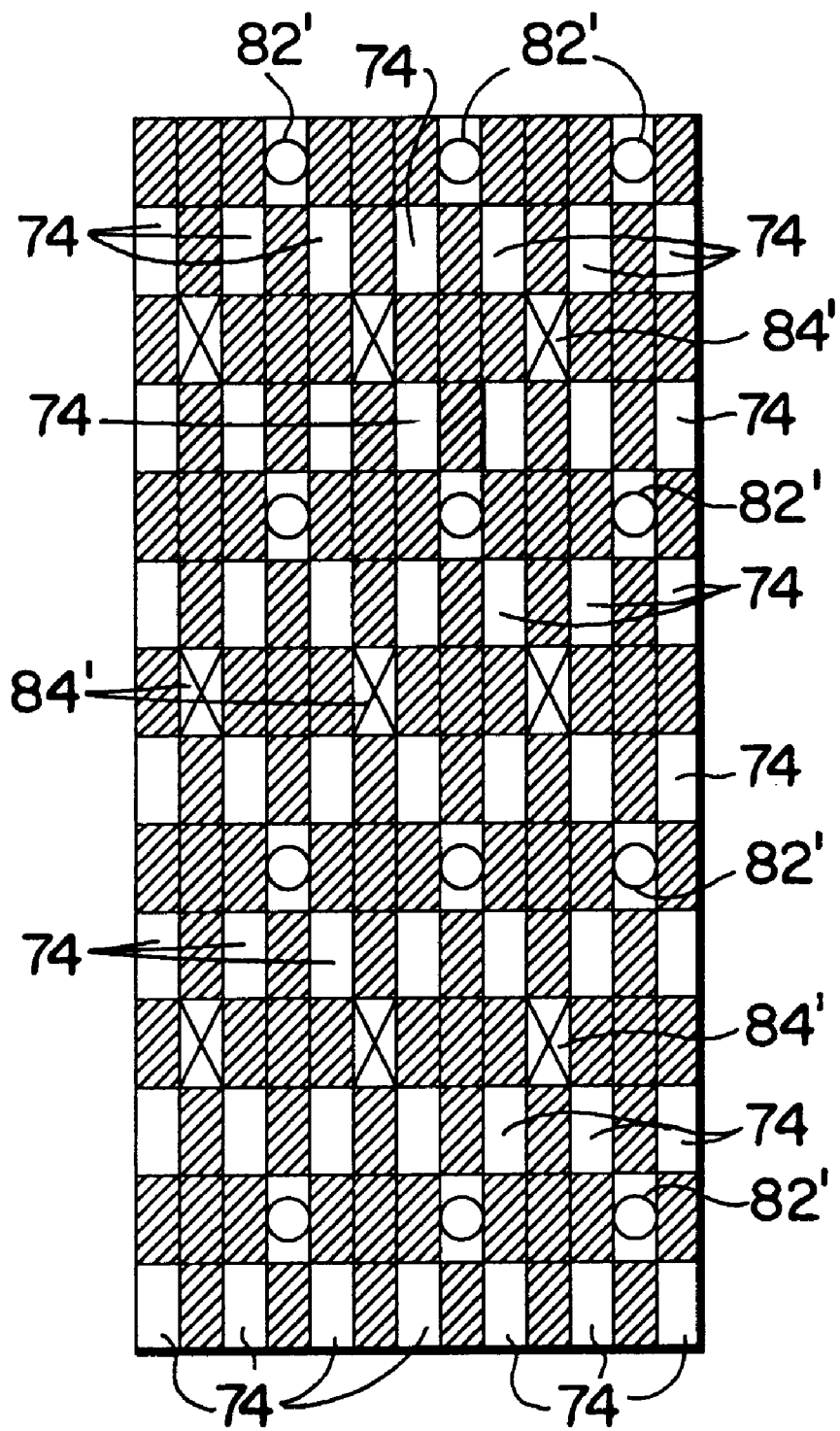
FIG. 9 is a section of FIG. 8 taken along lines 9—9.

Top 85 of the channel arrangement is partially broken away in FIG. 8 to show the relative direction of fluid flow through the various channels. The flow through the reaction channels is all in the same direction and the flow through the reaction channels alternates direction from channel to channel. FIG. 9 shows the pattern of channel openings and blockages associated with distribution chamber 72 in order to provide the direction of fluid flow through the appropriate channels. The inlets for the first set of reaction channels that receive reactants from sub-channel 78 are indicated by 82'. Reference numeral 74 indicates the location for the open inlets to the heating channels that are located between the distribution and collection sub-channels. Reference numeral 84' shows the location of the outlets that deliver reactants and products from the second set of reaction channels into the sub-channels 79. The other solid squares indicate where the openings to the heat exchange and reaction channels are closed to fluid flow.

EXAMPLES

To more fully illustrate the process and apparatus of this invention and its advantages, the following examples present the calculated operation of a tubular heat exchange type reactor and the calculated operation of different plate channel reactor arrangements of the type depicted in the Figures. All of the examples use the reactor arrangements for the oxidation of orthoxylene to phthalic anhydride. The numerical model uses well established kinetic data and experimentally developed heat transfer data. All of the catalytic data was based on performance parameters for a silicon carbide base material surface coated vanadiumpentoxide having a surface area of 2000 $cm^2/g$. All examples operated to keep the phthalide content in the effluent at less than 1000 ppm in the PA product. All of the examples modeled the use of molten salt as the cooling medium. Comparison of the numerical model against published literature for similar modeling studies verified the accuracy of the numerical model.

Example 1

Figure 10:
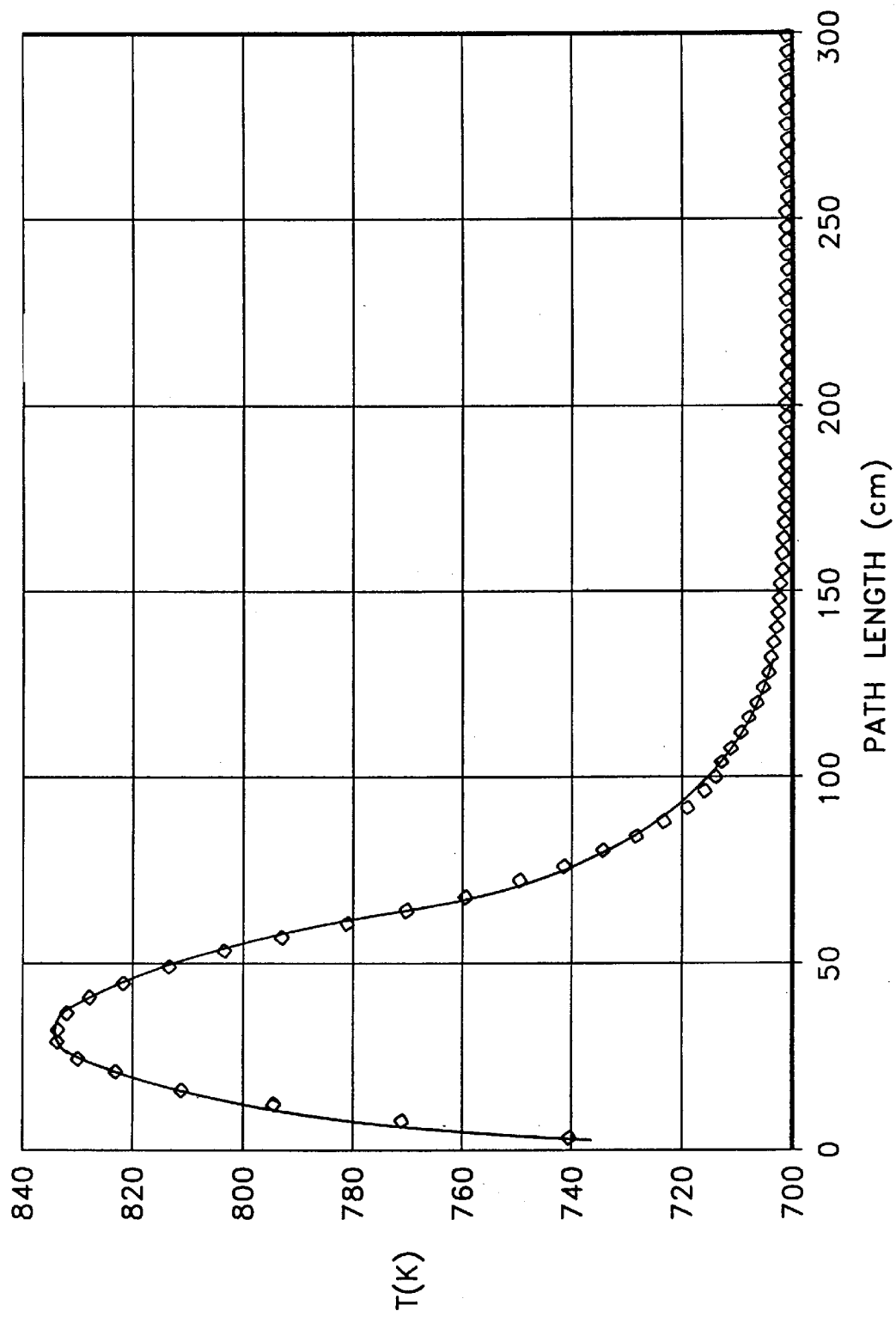
FIGS. 10 and 11 are graphs showing the temperature profile and conversion parameters along the path length of tubes in a tubular arrangement for PA production by orthoxylene oxidation.
Figure 11:
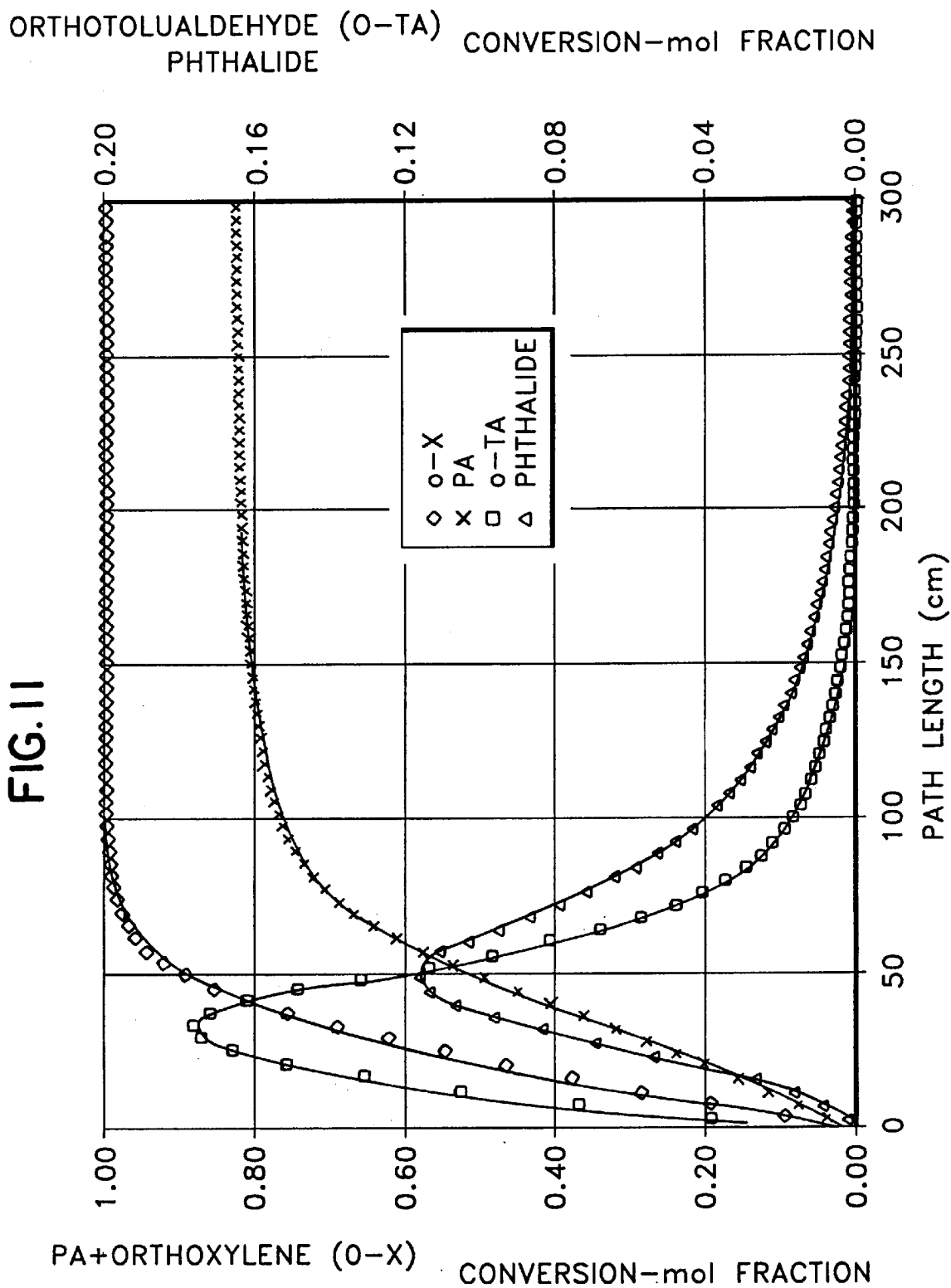

The example established the performance of the tubular reactor base case and produced similar results to current industrial tubular reactor performance. In this base case a feedstock of air containing an orthoxylene concentration of 75 $g/Nm^3$ feed passes through a three meter long tube having a diameter of 25 mm at a mass flux rate of 10,000 $kg/m^2/hr$ which produces a 0.3 bar pressure drop along the tube. The tubular reactor model uses a ring or shaped particle having a diameter of 9 mm. Circulation of a salt bath at a temperature of 698° K around the shell side of the tubes provides cooling. The feed enters the tubular reactor at a temperature of about 700° K. The final phthalide content in the PA product was below 1000 ppm. FIG. 10 graphically depicts the temperature profile over the length of a representative tube. The tube achieves a peak temperature of about 835° K within the first 50 cm of its path length. FIG. 11 illustrates an essentially complete conversion of orthoxylene with about the first 100 cm of tube length. As also presented by FIG. 11, continued conversion in the tubes reduces the concentration of orthotolualdehyde and phthalide to levels of less than 1000 ppm while raising the PA conversion to about 83%.

Example 2

Figure 12:
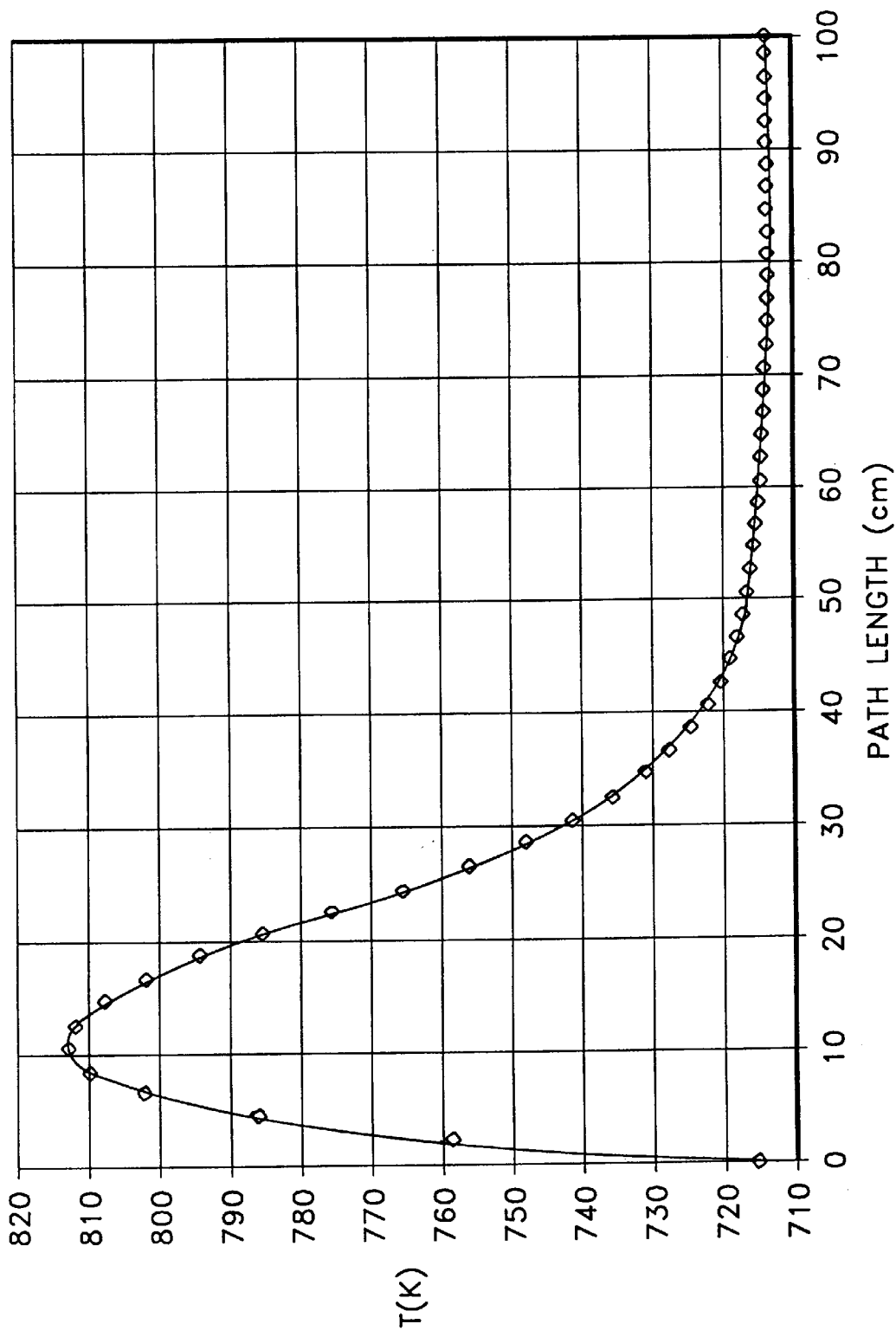
FIGS. 12 through 17 are graphs showing the temperature profile and conversion parameters along the path length of channels in plate heat exchange reactor arrangements for producing PA by orthoxylene oxidation.
Figure 13:
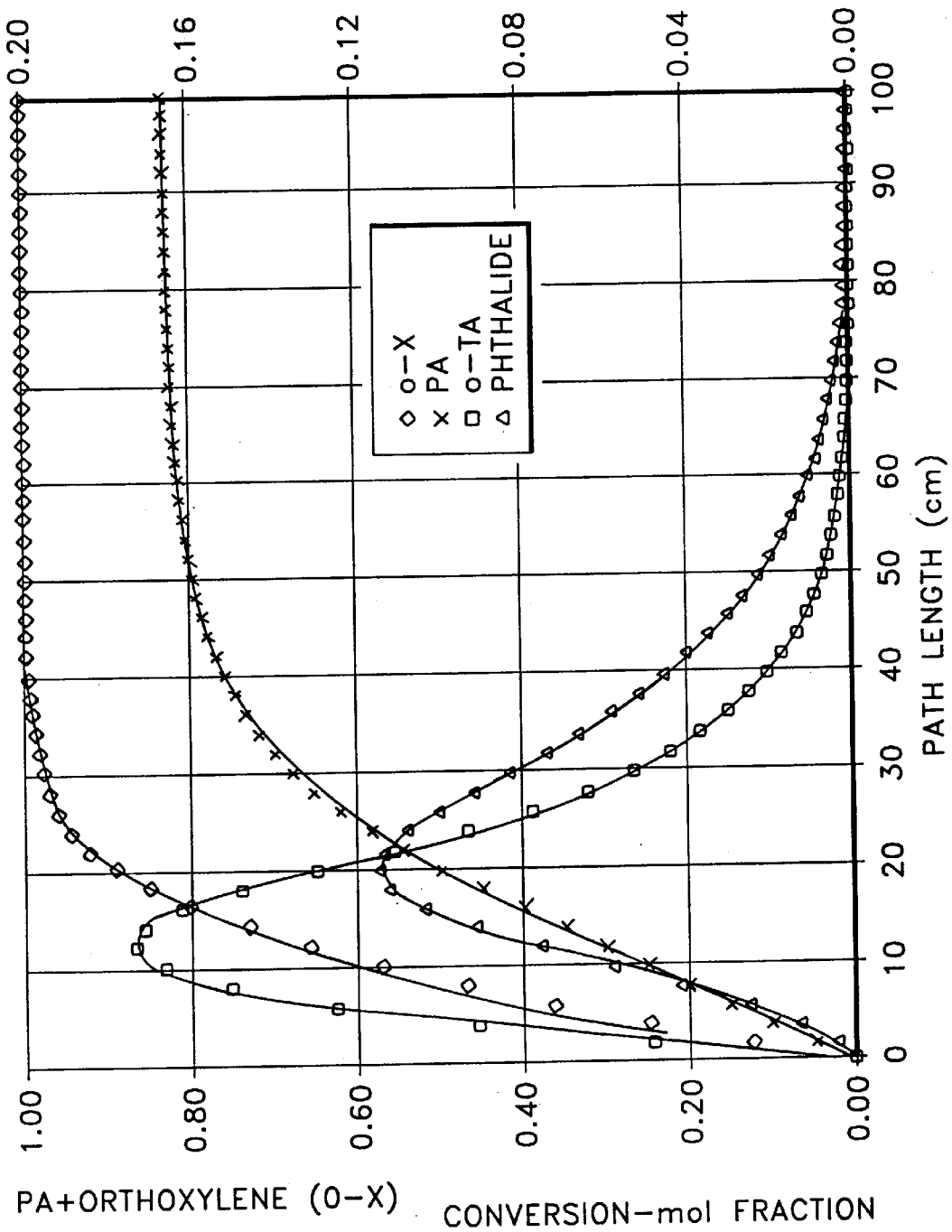

The basic plate heat exchanger type reactor operates at the same orthoxylene inlet concentration and mass flux through the heat exchange channels as the tubular reactor. The channel arrangement contains a 2 mm spherical catalyst in a 6 mm gap between channels. To maintain the same 0.3 bar pressure drop across the channels as across the tubes, the process flux in the plate reactor arrangement drops to 7500 $kg/m^2/hr$. Nevertheless, the sizing of the plate exchange reactor maintains the same ratio of heat transfer surface area to catalyst surface area on a per reactor volume basis as in the tubular reactor arrangement. At the same 75 $g/Nm^3$ concentration of orthoxylene in the air feed, the process inlet temperature in the plate exchanger reactor increases 15° C. above the tubular reactor case or to a temperature of about 713° K to maintain the same phthalide level in the PA product. Even with an increased inlet temperature, FIG. 12 shows the peak temperature in the channels decreasing to about 815° C., representing about a 20° C. temperature drop relative to the tubular reactor case. Again, FIG. 13 shows a rapid conversion of orthoxylene along the path length of the plate exchange reactor with about the same conversion to PA and orthotolualdehyde and phthalide to levels below 1000 ppm. Thus, the temperature reduction of this example demonstrates that the plate heat exchange reactor has about a 30% overall greater heat transfer ability than the tubular reactor.

Example 3

Figure 14:
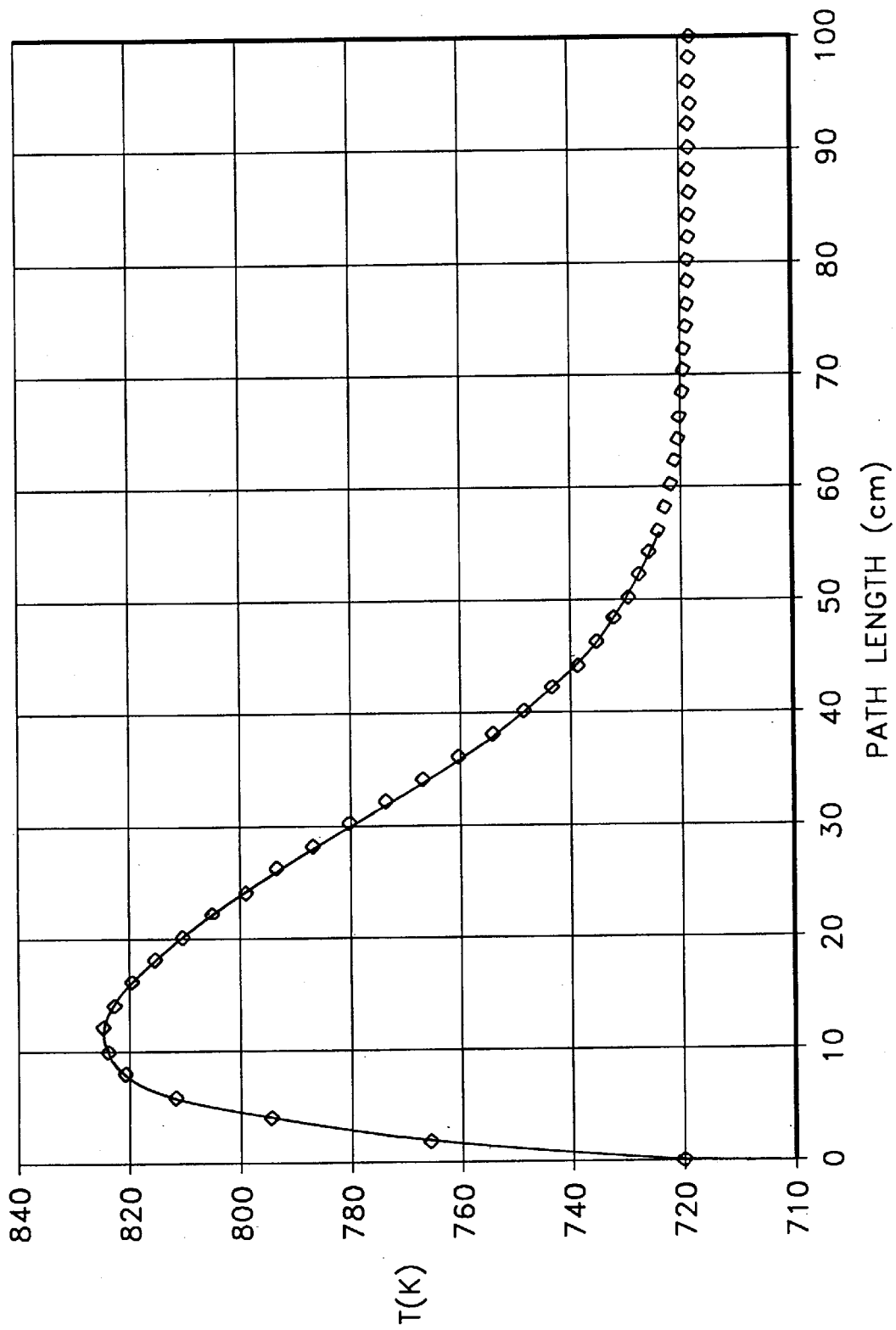
Figure 15:
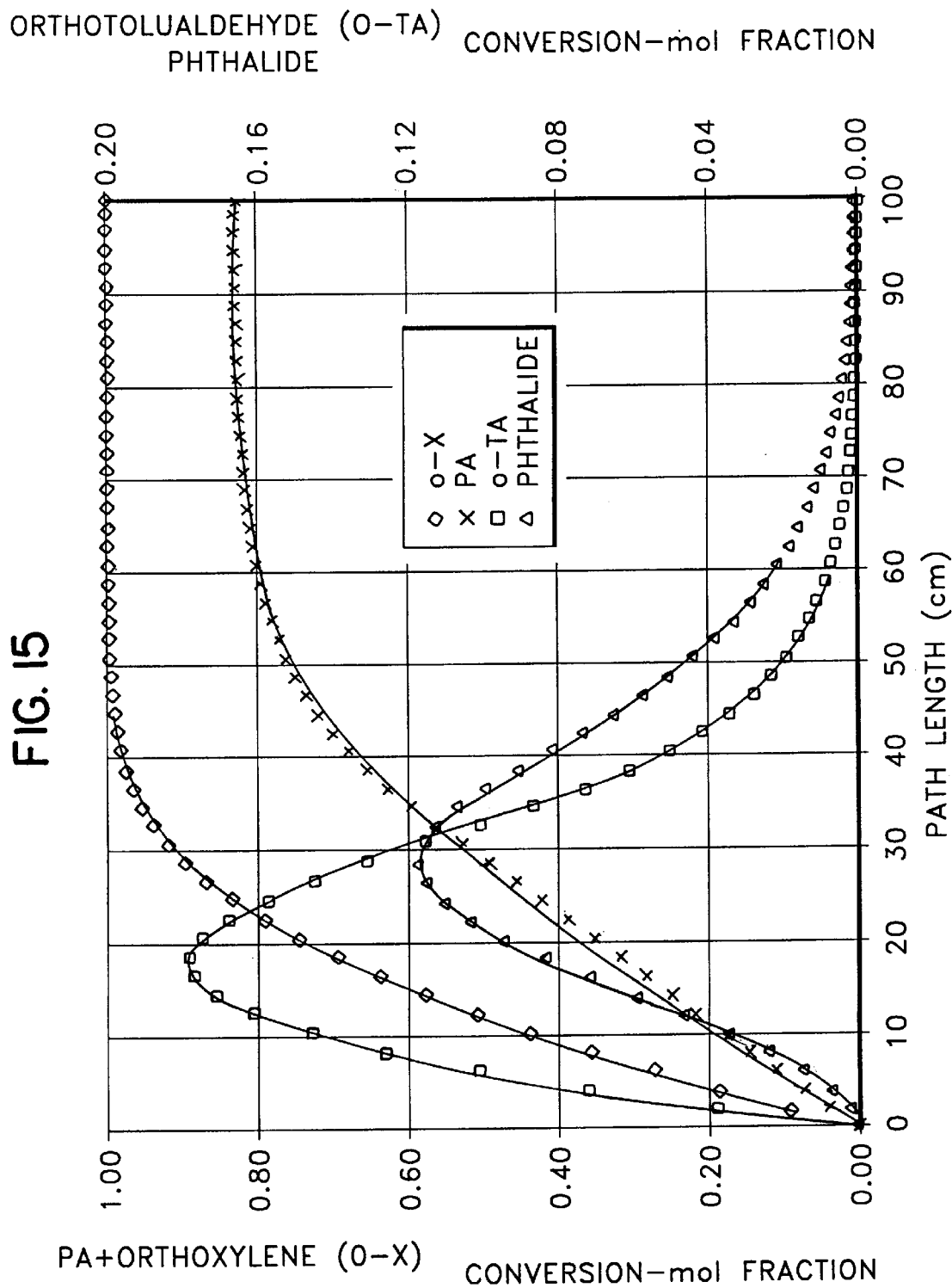

Example 3 evaluates increases in the concentration of the orthoxylene in the air to the plate exchange reactor over the range of from 75 $g/Nm^3$ to 110 $g/Nm^3$ to determine the concentration that produces the same peak temperature in the plate heat exchange reactor as in the tubular reactor. Heat from the additional orthoxylene oxidation requires increasing the circulating salt temperature from the 713° K in Example 2 to about 717° K to keep the phthalide concentration below 1000 ppm in the PA product. At a concentration level of about 105 $g/Nm^3$, the peak temperature of the plate reactor (see FIG. 14) approaches the same maximum temperatures as the tubular reactor arrangement. As established by FIG. 15, the maximum orthoxylene concentration can increase significantly over the tubular case reactor by use of the plate exchanger while still maintaining the PA conversion of about 83 mol %.

Example 4

Figure 16:
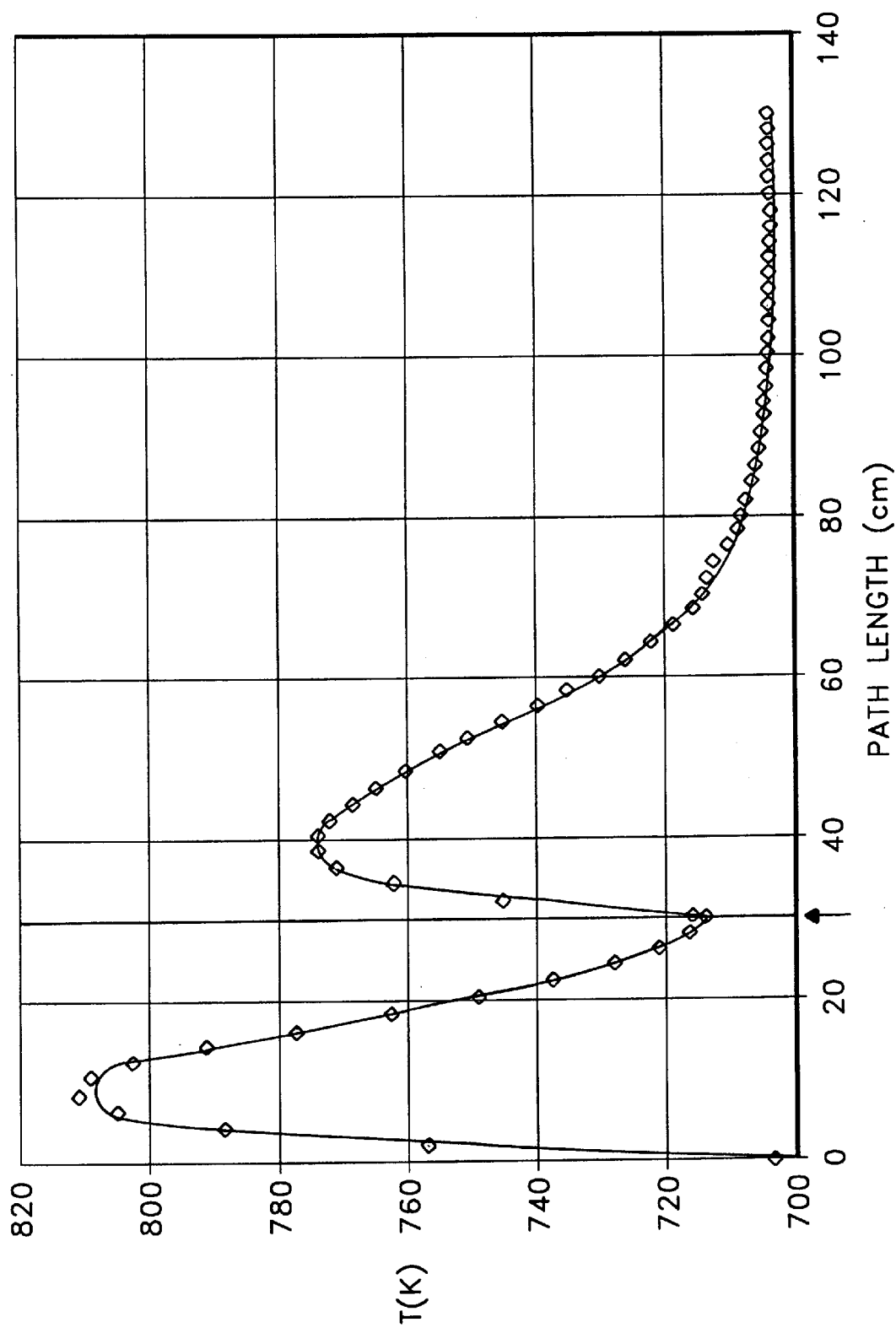
Figure 17:
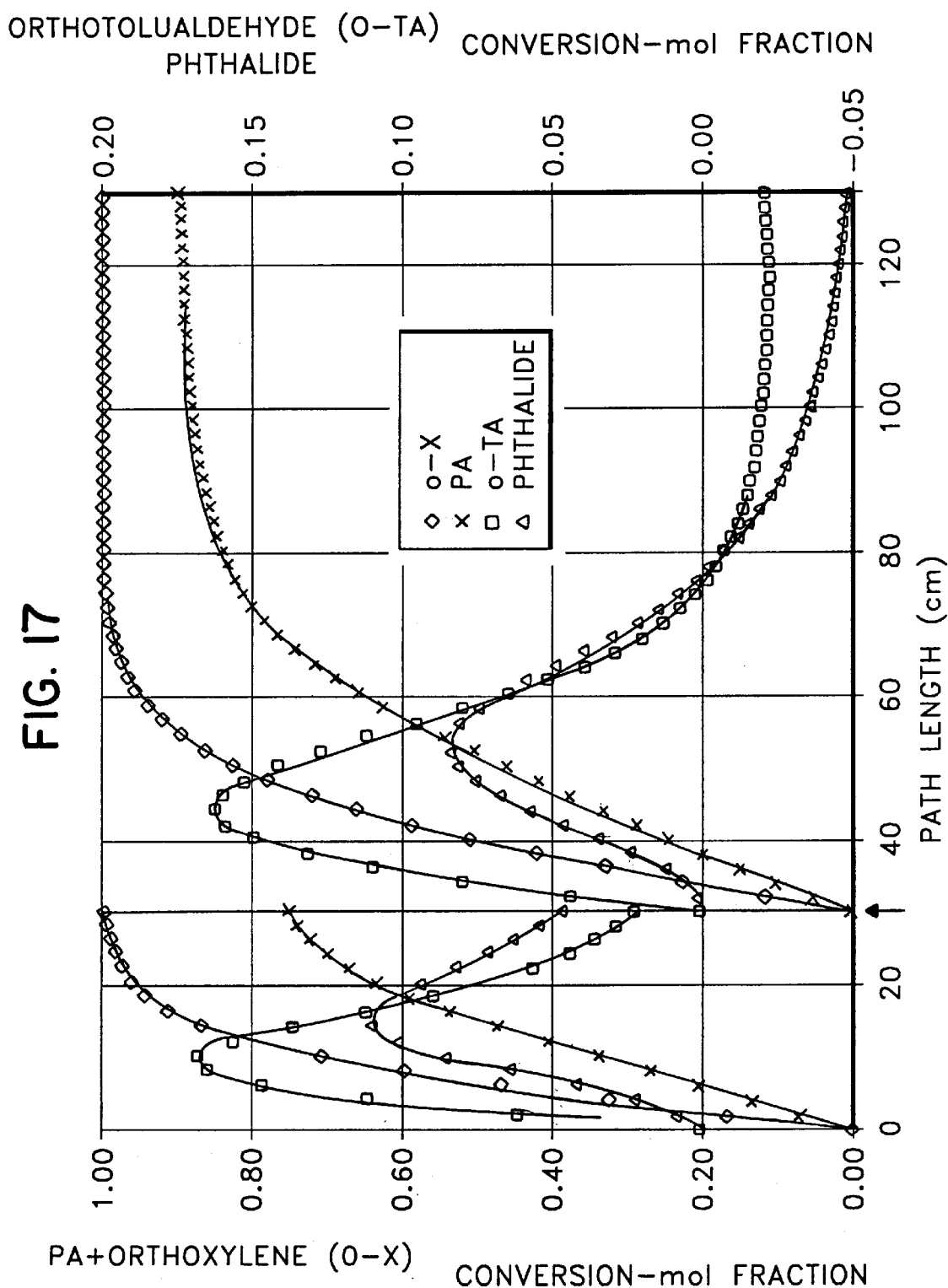

Example 4 demonstrates the effect on temperature and conversion of staging the injection of orthoxylene at an intermediate point in the channels to reestablish a maximum concentration of 75 g/Nm³. This example decreases initial injection of feed to reduce the process flux at the inlet of the plate reactor to 5525 kg/m²/hr for the first stage of orthoxylene injection. The arrangement injects additional orthoxylene at 30 cm along the path length of the heat exchange reactor. With the lower process flux, the temperature of the circulating salt bath drops to 700 ° K, the equivalent of the tubular reactor inlet temperature. The path length of the channels in this example increases to a total of 130 cm; that provides an additional 30 cm for the first stage while maintaining the same 100 cm of second stage that was used in Examples 2 and 3. The additional length decreases the phthalide content below 1000 ppm in the PA product. Nevertheless, even with the increased length, total pressure drop remains below the 0.3 bar value of the tubular reactor example. FIG. 16 displays a maximum peak temperature of below 810° K in the first stage. FIG. 17 shows an essentially complete orthoxylene conversion within the first 30 cm of the injection point. FIG. 17 demonstrates continued PA conversion at over 83%. As a result, a process unit using the tubular type to produce 50 kMta of PA would require 33 cubic meters of catalyst. By comparison, a plate heat exchange reactor using multiple feed injection to produce the same amount of PA product requires only about 12.8 m³ of catalyst and thereby significantly reduces capital costs of the plate reactor arrangement relative to the tubular reactor arrangement. Consequently, this example shows an effective doubling of orthoxylene feed concentration with staged feed injection over that of the tubular reactor.

Overall the examples establish numerous process advantages of the plate reactor arrangement over the tubular reactor arrangement. A comparison of the examples shows the overall added heat efficiency of using a plate heat exchange reactor arrangement that introduces a mixture of air and orthoxylene at a single inlet point for the production of phthalic anhydride. Using the plate reactor arrangement with an increasing orthoxylene concentration in the air at the single feed inlet produces additional advantages. Moreover, multiple feed injection of the orthoxylene in the plate reactor arrangement substantially reduces the plate reactor arrangement costs. Such savings can include a 50% reduction in air compression costs and substantial reduction in capital costs due to a smaller relative size for plate reactor versus the tubular reactor.

What is claimed is:

1. A process for contacting reactants with a catalyst in a reaction zone while indirectly heating or cooling the reactants in the reaction zone by indirect heat exchange with a heat exchange fluid, the process comprising:
   a) passing a reactant-containing stream through a first plurality of channels defined by a stack of spaced apart plates and recovering a first channel effluent;
   b) collecting the first channel effluent stream in a manifold volume having direct communication with outlets defined by the plates that define the first plurality of channels;
   c) injecting an intermediate fluid directly into the manifold volume and mixing at least a portion of the first channel effluent to produce a second channel input stream;
   d) passing the second channel input stream from the manifold volume directly into inlets of a second plurality of channels defined by said stack of spaced apart plates and having direct communication with the manifold volume;
   e) recovering a second channel effluent stream from outlets of the second plurality of channels;
   f) contacting at least one of the reactant stream and the second channel input stream with a catalyst in the first plurality of channels or the second plurality of channels; and
   g) indirectly exchanging heat with a heat exchange fluid and at least one of the reactant-containing streams and the second channel input stream, wherein the heat exchange fluid passes through channels defined by said stack of spaced apart plates.

2. The process of claim 1 wherein the reactant-containing stream exchanges heat with the second channel input stream across common spaced apart plates.

3. The process of claim 1 wherein the stack of spaced apart plates define heat exchange channels between the first and second plurality of channels.

4. The process of claim 3 wherein a heat exchange fluid passes through the heat exchange channels in relative cross flow to the reactant-containing stream in the first plurality of channels and to the second channel input stream in the second plurality of channels.

5. The process of claim 1 wherein the second plurality of channels contains a catalyst for promoting an endothermic or exothermic reaction.

6. The process of claim 1 wherein at least one of the first or second plurality of channels contains a catalyst for promoting an exothermic reaction and the manifold volume contains a packing material.

7. The process of claim 1 wherein different sides of common spaced apart plates define heat exchange channels between individual channels in the first plurality of channels and second plurality of channels.

8. A process for oxidizing reactants with a catalyst in a reaction zone while indirectly cooling the reactants in the reaction zone by indirect heat exchange with a heat exchange fluid, the process comprising:
   a) passing a first inlet stream containing oxygen and an oxidation reactant through a first plurality of channels defined by a stack of spaced apart plates and into contact with an oxidation promoting catalyst;
   b) passing an effluent from outlets defined by the plates that define the first plurality of channels directly into a manifold volume containing a packing material;
   c) injecting additional oxidation reactant into the manifold volume and mixing fluids therein to produce a second inlet stream containing oxygen and an oxidation reactant;
   d) passing the second inlet stream from the manifold volume directly to inlets of a second plurality of channels defined by said stack of spaced apart plates and through an oxidation promoting catalyst contained in the second plurality of channels;
   e) recovering a second channel effluent stream from the outlets of the second plurality of channels; and
   f) indirectly exchanging heat with the first and second plurality of channels by passing a heat exchange fluid through heat exchange channels defined by said stack of spaced apart plates.

9. The process of claim 8 wherein the heat exchange fluid passes through the heat exchange channels in relative cross flow to the fluid in the first and second plurality of channels.

10. The process of claim 8 wherein the first inlet stream comprises air and orthoxylene; the intermediate stream comprises orthoxylene; and the catalyst in the first and second plurality of channels comprises a silicon carbide base material surface coated with vanadiumpentoxide; and the second channel effluent comprises phthalic anhydride.

11. The process of claim 8 wherein the heat exchange fluid passes through a first distribution header that distributes the heat exchange fluid directly to inlets of the heat exchange channels defined by the stack of spaced apart plates and the first inlet stream passes through a packing material in a second distribution header that distributes the first inlet stream directly to inlets defined by the plates that define the first plurality of channels and that surrounds at least a portion of the first distribution header.

12. The process of claim 11 wherein a permeable wall of the second distribution header admits an oxygen-containing fluid into the second distribution header and an injector injects the oxidation reactant directly into the interior of the second distribution header.

13. The process of claim 12 wherein the oxygen-containing fluid comprises air; the oxidation reactant comprises orthoxylene; and the second channel effluent comprises phthalic anhydride.

14. A reaction apparatus for contacting reactants with a catalyst in a reaction zone while indirectly heating or cooling the reactants in the reaction zone by indirect heat exchange with a heat exchange fluid, the apparatus comprising:
   a) a stack of spaced apart plates defining a first plurality of reaction channels and a second plurality of reaction channels for retaining a catalyst material in at least one of the first and second plurality of channels and defining heat exchange channels;
   b) a first plurality of reaction inlets and a first plurality of reaction outlets defined by the first plurality of reaction channels;
   c) a second plurality of reaction inlets and a second plurality of reaction outlets defined by the second plurality of reaction channels;
   d) a distribution manifold defining a manifold volume in direct communication with the first plurality of reaction outlets and the second plurality of reaction inlets;
   e) an addition fluid injector extending into the manifold for injecting a fluid into the manifold volume; and
   f) heat exchange inlets for receiving a heat exchange fluid and heat exchange outlets for discharging a heat exchange fluid defined by the heat exchange channels.

15. The apparatus of claim 14 wherein the plurality of spaced apart plates are arranged in a stack having a side upon which at least one of heat exchange inlets or outlets are defined and upon which at least one of the reaction inlets or reaction outlets are defined, a first distribution header partially covers said side and extends across at least one of the heat exchange inlets or heat exchange outlets to define a first distribution space that communicates directly with the heat exchange inlets or outlets across which it extends to distribute or collect the heat exchange fluid and a second distribution header partially covers said side and partially covers at least a portion of the first distribution header and extends across at least one of the first reaction inlets or the first reaction outlets to define a second distribution space that communicates directly with the first reaction inlets or outlets across which it extends to distribute or collect fluid.

16. The apparatus of claim 15 wherein a containment vessel surrounds the stack and the second distribution header defines a fluid permeable surface to distribute or collect fluid from the containment vessel across the surface of the second distribution header.

17. The apparatus of claim 16 wherein the second distribution space distributes a reaction fluid to the first reaction inlets and an inlet fluid injector extends into the second distribution space to introduce an inlet fluid directly into the second distribution space.

18. The process of claim 14 wherein the reaction channels have an average width of less than 1 inch.

19. The apparatus of claim 18 wherein the plates are flat.

20. The apparatus of claim 19 wherein the plates define corrugation and the corrugations maintain the spacing of the plates.

* * * * *